(12) United States Patent
Frolov et al.

(10) Patent No.: US 11,962,390 B2
(45) Date of Patent: Apr. 16, 2024

(54) METHODS, APPARATUS AND SYSTEM FOR EXTENDED WIRELESS COMMUNICATIONS

(71) Applicant: SUNLIGHT AEROSPACE INC., Edison, NJ (US)

(72) Inventors: Sergey V. Frolov, New Providence, NJ (US); Michael Cyrus, Castle Rock, CO (US)

(73) Assignee: SUNLIGHT AEROSPACE INC., Edison, NJ (US)

( * ) Notice: Subject to any disclaimer, the term of this patent is extended or adjusted under 35 U.S.C. 154(b) by 151 days.

(21) Appl. No.: 15/785,104

(22) Filed: Oct. 16, 2017

(65) Prior Publication Data
US 2019/0115974 A1    Apr. 18, 2019

(51) Int. Cl.
| | |
|---|---|
| H04B 7/185 | (2006.01) |
| G05D 1/00 | (2006.01) |
| H01Q 1/12 | (2006.01) |
| H01Q 1/28 | (2006.01) |

(52) U.S. Cl.
CPC ....... *H04B 7/18504* (2013.01); *G05D 1/0202* (2013.01); *H01Q 1/125* (2013.01); *H01Q 1/286* (2013.01)

(58) Field of Classification Search
None
See application file for complete search history.

(56) References Cited

U.S. PATENT DOCUMENTS

| | | | | |
|---|---|---|---|---|
| 7,010,290 B2 * | 3/2006 | Dent | ........................ | G01S 11/16 340/691.5 |
| 7,787,823 B2 * | 8/2010 | George | ............ | H04B 10/25756 455/41.2 |
| 9,334,627 B2 * | 5/2016 | Self | .......................... | G01S 3/143 |
| 2006/0217851 A1 * | 9/2006 | McGuffin | ............ | H04B 7/18506 701/4 |
| 2006/0229103 A1 * | 10/2006 | Monk | ................. | H04B 7/18506 455/562.1 |
| 2008/0299990 A1 * | 12/2008 | Knoblach | ................. | B64B 1/40 455/456.1 |
| 2011/0181720 A1 * | 7/2011 | Edgeworth | ........... | G01J 5/0022 382/103 |
| 2017/0111102 A1 * | 4/2017 | Fan | ........................ | H04W 4/023 |

* cited by examiner

*Primary Examiner* — Gary Lafontant
(74) *Attorney, Agent, or Firm* — MOSER TABOA (57) ABSTRACT

A method, apparatus and system for extended wireless communication include an airborne platform including at least one antenna to pick up and radiate wireless signals, a platform controller to control the altitude and attitude of the airborne platform, and a communication payload. In an embodiment, the communication payload includes at least two transponders to establish wireless links and a controller having a processor and a memory coupled to the processor. In some embodiments, the memory has stored therein instructions executable by the processor to cause the airborne communication system to elevate the airborne platform to an altitude at which wireless connectivity is able to be established with a first wireless network, establish a first wireless link to the first wireless network, establish a second wireless link, and relay data between the first wireless link and the second wireless link.

27 Claims, 10 Drawing Sheets

METHODS, APPARATUS AND SYSTEM FOR EXTENDED WIRELESS COMMUNICATIONS

FIELD

Embodiments of the present invention generally relate to systems, methods and apparatus for extended wireless communications, and in particular to those for extending fixed and mobile wireless links with ground-based stations using airborne platforms.

BACKGROUND

Existing wireless communication systems, such as cellular phone networks, are often dominated by non-line-of-sight (NLOS) communication links, in which wireless transmitters and receivers are positioned outside of their common line of sight (LOS). As a result, signals in such systems usually experience attenuation and multiple reflections from obstacles before reaching their intended targets, in the process losing their power and degrading in quality, as described for example by the signal-to-noise ratio (SNR). Often a complete or partial loss of signal can result due to such propagation losses and multipath interference effects between a stationary base station and a mobile user equipment.

Such a loss of a NLOS wireless link can occur even in the vicinity of a base station, when it is blocked by a natural obstacle like a hill or a man-made object like a large building. This problem is further worsened at larger distances between receivers and transmitters, where even relatively smaller objects can impede signal propagation. In all cases, the NLOS propagation loss, or signal attenuation, is almost always much greater than the LOS propagation loss for the same separation between the transmitter and receiver. Therefore, establishing a LOS path to the base station could substantially improve the performance of a wireless communication system. Furthermore, improving transmission characteristics of such a path by, for example, lowering corresponding signal attenuation and/or reducing multipath and external signal interference could improve performance even further, leading to faster transmission of digital data and a longer communication range.

SUMMARY

Methods, apparatuses and systems for providing extended wireless communications are provided herein.

In some embodiments, a method for providing extended wireless communications includes providing an airborne platform having a communication payload able to establish at least a first and a second wireless link, elevating the airborne platform to an altitude at which wireless connectivity is able to be established with a first wireless network, establishing a first wireless link to the first wireless network using the communication payload of the airborne platform, establishing a second wireless link using the communication payload of the airborne platform, and relaying data between the first wireless link and the second wireless link using the communication payload.

In some embodiments, an airborne system for providing extended wireless communications includes an airborne platform including at least one antenna to pick up and radiate wireless signals, a platform controller to control the altitude and attitude of the airborne platform, and a communication payload. In an embodiment, the communication payload includes at least two transponders to establish wireless links and a controller having a processor and a memory coupled to the processor. In some embodiments, the memory has stored therein instructions executable by the processor to cause the airborne communication system to elevate the airborne platform to an altitude at which wireless connectivity is able to be established with a first wireless network, establish a first wireless link to the first wireless network, establish a second wireless link, and relay data between the first wireless link and the second wireless link.

In some embodiments, an apparatus for providing extended wireless communications includes a communication payload which includes at least two transponders to establish wireless links, and a controller having a processor and a memory coupled to the processor. In some embodiments, the memory has stored therein instructions executable by the processor to cause the apparatus to elevate an airborne platform on which the communication payload exists to an altitude at which wireless connectivity is able to be established with a first wireless network, establish a first wireless link to the first wireless network, establish a second wireless link, and relay data between the first wireless link and the second wireless link.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention can admit to other equally effective embodiments.

To facilitate understanding, identical reference numerals have been used, where possible, to designate identical elements that are common to the figures. The figures are not drawn to scale and can be simplified for clarity. It is contemplated that elements and features of one embodiment can be beneficially incorporated in other embodiments without further recitation.

DETAILED DESCRIPTION

In the following detailed description, numerous specific details are set forth in order to provide a thorough understanding of exemplary embodiments or other examples described herein. However, it will be understood that these embodiments and examples can be practiced without the specific details. In other instances, well-known methods, procedures, components, and/or circuits have not been described in detail, so as not to obscure the following description. Further, the embodiments disclosed are for exemplary purposes only and other embodiments can be employed in lieu of, or in combination with, the embodiments disclosed.

In accordance with the present principles, the inventors provide an improved wireless communication system, apparatus and method which incorporate one or more benefits of a system with wireless LOS links. Such a system, apparatus and method can be supported by various wireless platforms and can be operated as a stand-alone communication system or as an extension of an existing communication system.

Figure 1:
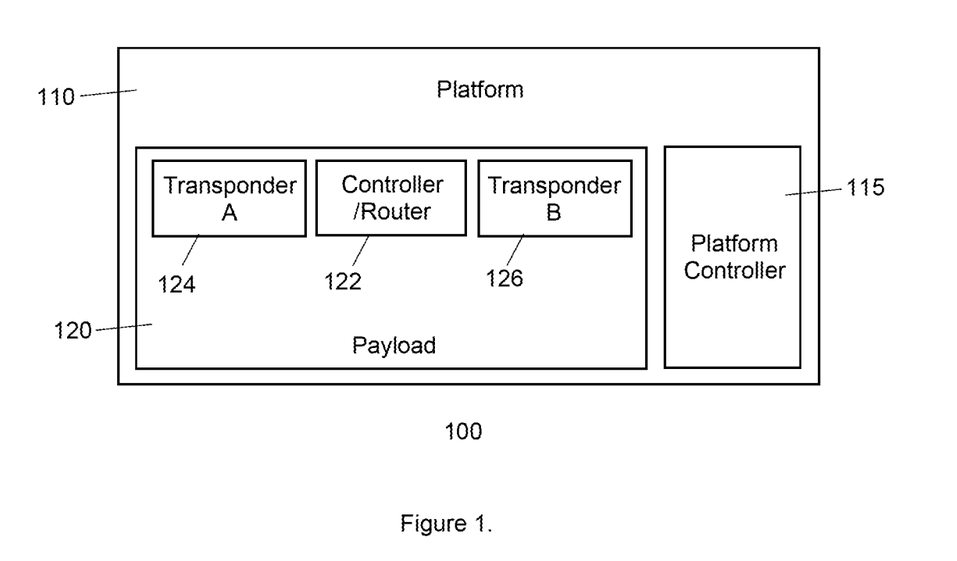
FIG. 1 depicts a high level block diagram of an airborne communication system in accordance with an embodiment of the present principles.

FIG. 1 depicts a high level block diagram of an airborne communication system 100 in accordance with an embodiment of the present principles. The airborne communication system of FIG. 1 illustratively includes an airborne platform 110, a flight control system 115, and a communication payload 120, comprising a controller/router 122 and at least two transponders, transponder A and transponder B, 124 and 126, respectively. The airborne platform 110 of FIG. 1 can comprise substantially any aircraft, such as a plane, rotorcraft, vertical take-off and landing (VTOL) aircraft, rocket, lighter-than-air (LTA) aircraft or a kite. The airborne platform 110 can include a flight control system 115 to control the platforms attitude or position while being airborne or on the ground. The flight control system 115 can be manual, remote or autonomous. In the embodiment of FIG. 1, the communication payload 120 provides communication capabilities for the airborne communication system 100 using wireless links with other communication equipment on the ground, in the air or in space. As depicted in FIG. 1, the communication payload 120 includes a communication module controller 122, which can function as a communication network router, a server and/or a network node. The communication payload 120 also includes wireless transponders A and B, 124 and 126, respectively, which establish wireless communication links with other communication equipment and send received wireless signals to the controller 122. In various embodiments, the communication payload 120 can further include other communication transponders with similar or complimentary functionality to transponders A and B, 124 and 126.

The communication transponders A and B can implement different types of media to provide communication links, such as electro-magnetic emission at radio frequencies (RF), optical emission in the visible and infrared spectral ranges and sound waves. In an embodiment in which RF communications are implemented, a transponder can use a wide range of available RF spectrum from about 1 MHz to about 100 GHz, provided the spectrum is not protected by local or international regulations. In various embodiments, the protocols for such RF communications can be analog, such as AM (Amplitude modulated) and FM (Frequency modulated) radio, or digital, such as Ethernet communications. In various embodiments, an RF transponder can be connected to an antenna or multiple antennas. In embodiments implementing optical communications, an image or a beam of light can be used for data transmission. For example, an imaging camera can be used to record images from remote sources, which can then be processed to extract encoded information. Similarly, an airborne light or an array of light sources can be used to signal and transfer information to remote observers. Alternatively, a collimated beam of light can be used for a high rate information transfer between optical transponders using free space optics (FSO) and such light sources as lasers. In the case of FSO communications, these transponders can be also connected to gimbal-mounted telescopes to enable pointing them in arbitrary directions. In embodiments implementing acoustic communications, both audible sound and ultrasound frequencies can be used for communication purposes. For example, an audible frequency acoustic transponder can comprise a speaker and can be used for voice broadcasting. Similarly, a microphone can be used for receiving acoustic inputs in remote areas.

Figure 2:
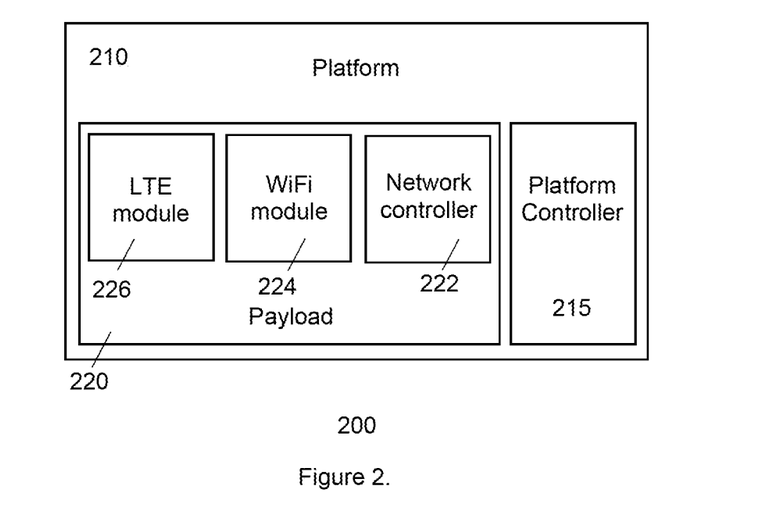
FIG. 2 depicts a high level block diagram of a communication system in accordance with a more specific embodiment of the present principles.

FIG. 2 depicts a high level block diagram of a communication system 200 in accordance with a more specific embodiment of the present principles. Communication system 200 of FIG. 2 illustratively comprises an airborne platform 210, a flight control system 215 and a communication payload 220, which enables wireless cellular and WiFi (Wireless Fidelity) communication links with other communication equipment. The flight control system 215 can be implemented to control the attitude or position of the platform 210 while being airborne or on the ground, for example, in response to signals from a network controller 222. In the embodiment of FIG. 2, payload 220 comprises the network controller 222, a WiFi module 224 for WiFi communications and a Long Term Evolution (LTE) module 226 for cellular communications. In various embodiments, the WiFi module 224 can be configured as an access point for other communication equipment, in the air or on the ground, that support at least one of IEEE 802.11 set of WiFi specifications and protocols, e.g. 802.11n.

In some embodiments, the WiFi module 224 can include an RF amplifier for boosting power of transmitted and received signals to improve signal quality and increase communication range and speed. There can be limits to the output power provided by the RF amplifier as determined by local regulations and authorities for wireless communications. In addition, the WiFi module 224 can be connected to one or more external antennas. In some embodiments, a single directional antenna can be used to increase transmitted and received signal power in one or more directions. For example, a dipole antenna can be used to achieve gain of up to 5 dB and even higher, depending on its length. In addition, a reflector, such as a 90-degree corner reflector, can be used to provide gains up to 10 dB. A parabolic reflector in combination with a dipole antenna can be used to achieve 12-13 dB antenna gain. In addition to or alternatively, in some embodiments a biquad or a biloop antenna can be used to achieve a gain of about 14 dB while maintaining a relatively small form factor (i.e. the characteristic size) on the order of the RF wavelength used in a wireless link or less. As a result, the WiFi communication range provided by the WiFi module 224 can be substantially larger than a typical WiFi range of 100 feet or less. With an antenna gain of 10 dB, this range can be extended to about 1000 feet, while maintaining about 1 Mbps link capacity in one or both directions (uplink and downlink, i.e. signal reception and transmission). Thus, an airborne system 200 in accordance with the present principles can provide WiFi services to users on the ground covering an area of at least up to 36 acres, which is the coverage area of a typical micro-cell in a modern cellular network. As such, users within the WiFi coverage area provided by the present principles are able to connect to the airborne WiFi network ("SkyFi" network) of the present principles and communicate, for example, using Ethernet or Voice over IP (VoIP).

In the embodiment of the communication system 200 depicted in FIG. 2, the LTE module 226 can be used to provide a wireless link to a neighboring cellular network using LTE's licensed RF spectrum and communication protocols. A nearby cellular network can include a cell tower or a roof-mounted base station. The LTE module 226 can provide a direct broadband wireless link to such a base station within a range of at least 20 miles, which can then serve as an internet gateway between the airborne WiFi network of the present principles and external networks. In alternate embodiments in accordance with the present principles, an internet gateway can be provided by a different WiFi link to a nearby access point, if available, using a long-range WiFi module similar to the module 224 instead of the LTE module 226 of the embodiment of FIG. 2. In addition, in accordance with alternate embodiments of the present principles, instead of LTE protocols, other broadband mobile wireless technologies can be also used for providing internet gateway links, such as for example WCDMA (Wideband Code Division Multiple Access), EVDO (Evolution Data Optimized), WiMAX (Worldwide Interoperability for Microwave Access), LTEA (LTE Advanced), LTE-U (LTE Unlicensed), 5G (5$^{th}$ Generation) and other modern and future wireless communication technologies.

In the embodiment of the communication system 200 depicted in FIG. 2, the network controller 222 in the communication system 200 can be configured to provide internet protocol (IP) routing services between users connected to the airborne WiFi network and also to and from the external networks via the gateway provided by the cellular internet link. In accordance with the present principles, the network controller 222 is capable of supporting all common IP service requests such as Dynamic Host Configuration Protocol (DHCP), Domain Name Service (DNS), Hypertext Transfer Protocol (HTTP), File Transfer Protocol (FTP), Simple Mail Transfer Protocol (SMTP), Session Initiation Protocol (SIP) and others. In addition, the network controller 222 is capable of providing other capabilities to the communication system 200, including dynamic resource management (such as communication channels sharing and provisioning), RF interference monitoring, data cashing, data storage, local cloud computing (i.e., inside the payload 220), extended cloud computing (i.e., using the gateway), coverage area monitoring and surveillance and others.

Figure 3:
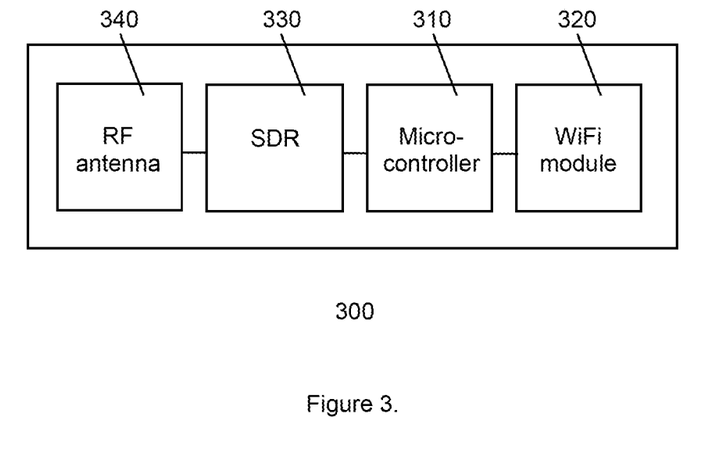
FIG. 3 depicts a high level block diagram of a communication payload that can be used in the communication system of FIG. 1 in accordance with an alternate embodiment of the present principles.

FIG. 3 depicts a high level block diagram of a communication payload 300 that can be used in the communication system 100 of FIG. 1 in place of the communication payload 120 in accordance with an alternate embodiment of the present principles. The communication payload 300 of FIG. 3 illustratively comprises a microcontroller 310, a WiFi module 320, a Software-Defined Radio (SDR) module 330 and an RF antenna 340. In various embodiments, other elements can be included in the communication payload 300, such as RF amplifiers and high-gain antennas (not shown) for extending communication range and speed. The microcontroller 310 of FIG. 3 can be used to support operations of both the WiFi module 320 and the SDR module 330. The WiFi module 320 can be used to connect to a nearby WiFi Access Point (AP) (e.g. a WiFi-enabled ground control station (GCS)). Alternatively or in addition, the WiFi module 320 can be configured as an AP, so that a number of different communication equipment can be connected to the communication payload 300 via, for example, WiFi links.

The SDR module 330 of FIG. 3 can be configured, using for example, firmware of the SDR module 330 and software stored on the microcontroller 310, to operate in any available RF frequency range via either analog or digital communication formats. For example, an SDR module 330 can operate in the frequency range from 3 MHz to 3 GHz, so that an RF transponder based on such a module can operate either as an analog High Frequency (HF) or Very High Frequency (VHF) radio in the range of about 3-300 MHz, a digital LTE transceiver at 2-3 GHz or any other RF transponder operating in this frequency range. In embodiments in which the SDR module 330 is configured as a long-wave radio transmitter, the communication payload 300 can be used for long distance (>20 miles) voice and data broadcasting and point-to-point communications. The communication bandwidth in such a link can be traded off for a much longer transmission range, for example not achievable either with WiFi or LTE communication links. Alternatively or in addition, the SDR module 330 can be configured to operate in the short microwave range (e.g. from 1 GHz to 100 GHz). In embodiments in which the SDR module is operating at, for example 10 GHz, the SDR module 330 can be used to link to communication satellites orbiting Earth. In any of the embodiments described herein, the WiFi link provided by the WiFi module 320 can serve as a communication channel for relaying voice and data from external communication equipment (e.g. users on the ground) via the microcontroller 310 to the SDR module 330.

Figure 4:
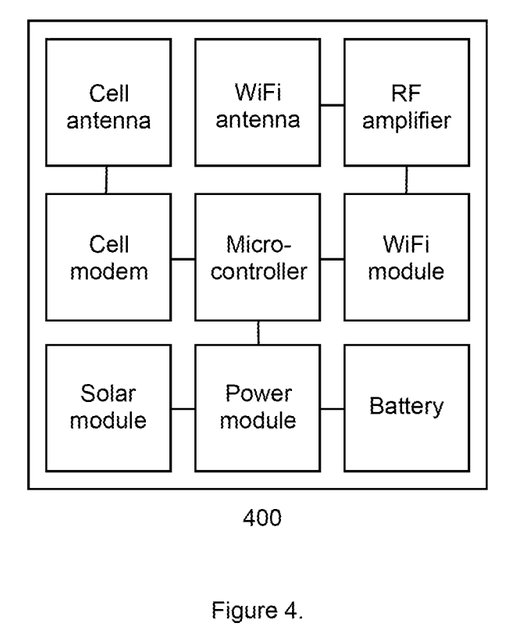
FIG. 4 depicts a high level block diagram of communication payload that can be used in the communication system of FIG. 1 in accordance with an alternate embodiment of the present principles.

FIG. 4 depicts a high level block diagram of communication payload 400 that can be used in the communication system 100 of FIG. 1, in place of the communication payload 120, in accordance with an alternate embodiment of the present principles. The communication payload 400 of FIG. 4 illustratively comprises a microcontroller 410, a power module 402, a solar module 404, a battery 406, a WiFi module 420 (e.g., the transponder A), an RF amplifier 408, a WiFi antenna 412, a cell (cellular) modem 414 (e.g., the transponder B) and a cell antenna 416. In general, the operation of the microcontroller 410, the WiFi module 420 and the cell modem 414 are similar to the equivalent components described above with regards to FIG. 3. In accordance with various embodiments, the payload 400 of FIG. 4 is provided with an autonomous power supply and power management capabilities. The power module is capable of managing the power consumption of the payload 400 and also use renewable energy sources (solar power) via the solar module 404 to recharge the battery 406. In some embodiments, photovoltaic cells (not shown) are mounted on the solar module 404 such that the photovoltaic cell can be exposed to sunlight. In the communication payload 400 of FIG. 4, the power module 402 provides and manages the power supply for the system.

Figure 5:
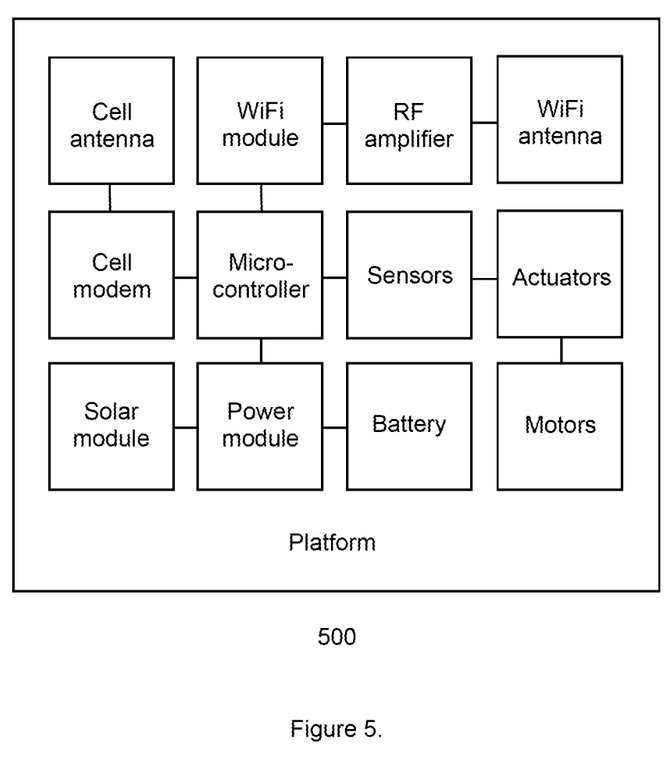
FIG. 5 depicts a high level block diagram of an airborne communication system in accordance with an alternate embodiment of the present principles.

FIG. 5 depicts a high level block diagram of an airborne communication system 500 in accordance with an alternate embodiment of the present principles. The airborne communication system 500 of FIG. 5 illustratively comprises an airborne platform 505, a microcontroller 510, a power module 502, a battery 506, an optional solar module 508, actuators 518, motors 522, sensors 524, a WiFi module 520, an RF amplifier 508, a WiFi antenna 512, a cell modem 514 and a cell antenna 516. The airborne communication system 500 is similar in functionality to the airborne communication system 100 of FIG. 1, however, the airborne communication system 500 is more integrated, such that avionics, for example, aircraft electronics, such as flight control system, sensors, actuators, motors, power modules and elements of the communication system, for example, payload elements, such as a router, transponders, RF amplifiers and antennas are integrated. For example, in one embodiment in accordance with the present principles, the microcontroller 510 of the airborne communication system 500 is enabled to provide both, the flight control of the airborne platform and control of communication functions for the wireless transponders (e.g., the WiFi and cell modules). In such embodiments, aircraft actuators and other flight control elements, such as ailerons, elevators and rudders (not shown), can be used to adjust a position of antennas mounted on an aircraft by changing a position of the aircraft. In the airborne communication system 500 of FIG. 5, the power module 502 provides and manages the power supply for the airborne communication system 500.

Figure 6:
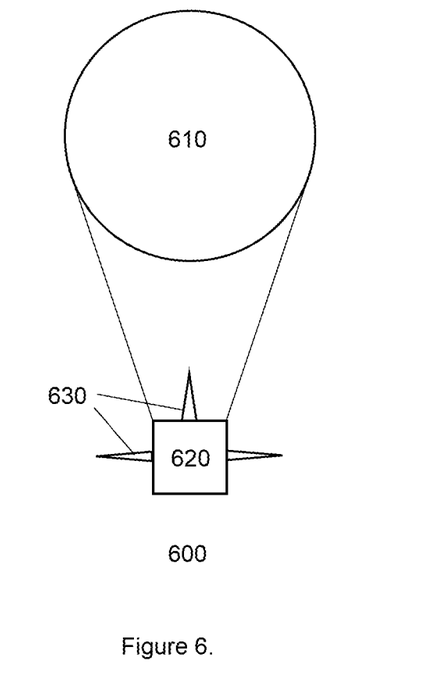
FIG. 6 depicts a high level block diagram of an airborne communication system using an aerostat as a platform in accordance with an embodiment of the present principles.

In accordance with the present principles, different airborne platforms can be used for implementing an airborne communication system of the present principles. For example, FIG. 6 depicts a high level block diagram of an airborne communication system 600 using an aerostat 610 as a platform in accordance with an embodiment of the present principles. The airborne communication system 600 of FIG. 6 illustratively comprises an aerostat 610, a communication payload 620 and external antennas 630. In various embodiments, the aerostat 610 can comprise an airship, a hot-air balloon or any other LTA aircraft. In various embodiments in accordance with the present principles, the aerostat 610 can be tethered to the ground or free-flying. The aerostat 610 can be equipped with means for propulsion and also attitude and altitude adjustment, such as for example motor-driven propellers (not shown). In various embodiments, antennas and power modules, such as solar cells, can be integrated into the skin of the aerostat 610 to more efficiently utilize available area on the platform.

Figure 7:
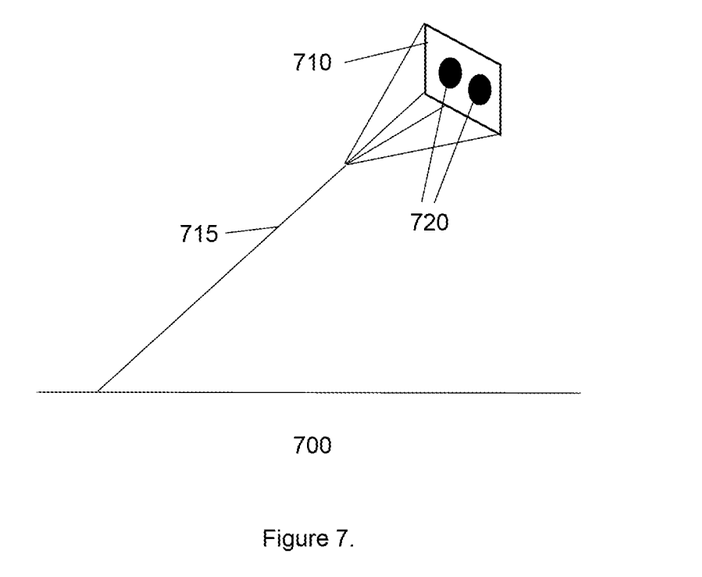
FIG. 7 depicts a high level block diagram of an airborne communication system in accordance with an alternate embodiment of the present principles.

FIG. 7 depicts a high level block diagram of an airborne communication system 700 in accordance with an alternate embodiment of the present principles. The airborne communication system 700 of FIG. 7 illustratively comprises a kite 710 on a tether 715 as a platform, a communication payload (not shown) and RF antennas 720. In various embodiments of the present principles, the communication payload can be integrated with the kite 710 or positioned on the ground. In an embodiment in which a communication payload is positioned on the ground, the antennas 720 can be connected to the payload via coaxial cables on the tether 715. The kite 710 can be tethered to the ground or a ground-based object, such as a tower or a building, and flown in the presence of a wind. Alternatively, a kite can be tethered to a moving object, such a ground or water-based vehicle or another aircraft, such that the kite 710 can be flown even in the absence of wind. In airborne communication system 700 of FIG. 7, the tether 715 can function as a power line and or a communication cable to provide electrical power and additional wired link capabilities to the communication payload. The length of the tether 715 can be varied to alter the altitude of the kite 710 so that the performance of airborne communication system 700 can be optimized for better coverage or improved signal reception.

Figure 8:
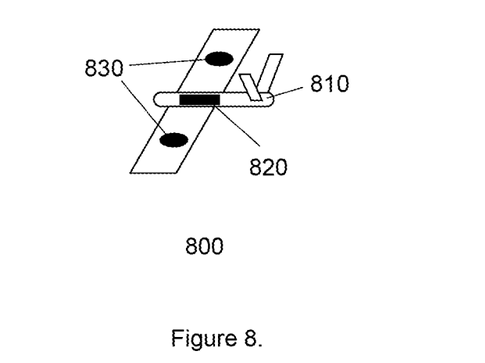
FIG. 8 depicts a high level block diagram of an airborne communication system in accordance with an alternate embodiment of the present principles.

FIG. 8 depicts a high level block diagram of an airborne communication system 800 in accordance with an alternate embodiment of the present principles. The airborne communication system 800 of FIG. 8 illustratively comprises a plane 810 as a platform, a communication payload 820 and external antennas 830. In various embodiments, the fixed-wing airframe of the plane 810 can be implemented in other ways, which are different from the embodiment depicted in FIG. 8. That is, in general, the plane 810 can include a fuselage, a wing and a tail. The plane can include a propulsion system and means for controlling the flight of the plane, such as a flight control system and an autopilot (not shown). In some embodiment, the payload 820 can be integrated with the plane 810 as discussed above with reference to the airborne communication system 500 depicted in FIG. 5. In other embodiments, the external antennas 830 can be integrated with the aircraft skin (e.g. wing surfaces). The external antennas 830 can also include RF phased array antennas with capabilities to provide high gain for RF emissions in arbitrary directions that can be altered electronically by adjusting RF phases at the input of the array. Such antennas can also be used to simultaneously produce multiple RF beams in different directions. In other embodiments, antennas can be used to produce multiple RF beams and tunable gain.

In various embodiments of the airborne communication system 800, the plane 810 can be manned or unmanned aircraft (e.g., UAV). In the latter embodiment, the system 800 can include ground-based components, such as a ground control station (GCS) (not shown). The GCS and the UAV can have independent means for establishing communications, such as specialized telemetry radios and remote radio controllers. Alternatively, the GCS can use any links provided by the payload 820 for receiving telemetry and sending flight control commands to the plane 810. For example, a WiFi module can be used instead of a specialized telemetry radio to communicate with a flight control system. In addition or alternatively, the airborne communication system 800 can use an LTE module to communicate with the GCS through an external network, such as a mobile cellular network. In some embodiments, the GCS can be a cell phone or a computer workstation connected to the internet. As a result, communications between the aircraft and the GCS can persist beyond the LOS, so that the GCS can be located thousands of miles from the aircraft it controls.

Figure 9:
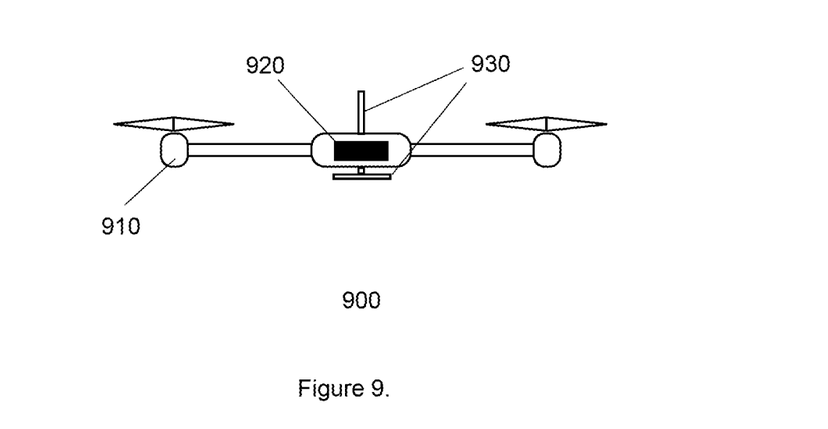
FIG. 9 depicts a high level block diagram of an airborne communication system in accordance with an alternate embodiment of the present principles.

FIG. 9 depicts a high level block diagram of an airborne communication system 900 in accordance with an alternate embodiment of the present principles. The airborne communication system 900 of FIG. 9 illustratively comprises a rotorcraft 910 as a platform, a communication payload 920 and external antennas 930. In various embodiments, the rotorcraft 910 can comprise a helicopter or a multi-copter, such as quadcopter, octocopter and other configurations. The rotorcraft 910 can comprise a UAV that includes an onboard autopilot or flight control system, a GCS and a telemetry link between them. In various embodiments, the external antennas 930 can be either stand-alone antennas or integrated into the airframe of the rotorcraft 910. The external antennas 930 provide high gain in predefined directions (such as vertical or horizontal). In addition, the external antennas 930 can have different orientations—for example one pointing horizontally and another pointing vertically. In addition, the external antennas 930 can be mounted on movable gimbal mounts, so that the orientation and pointing direction can be changed.

Figure 10:
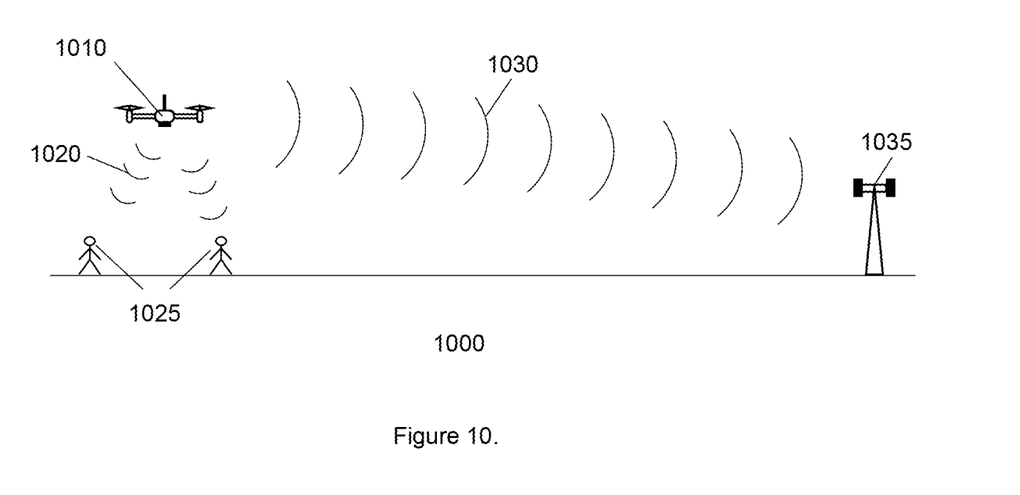
FIG. 10 depicts a use case scenario in which an airborne communication system provides a local wireless network for users using a wireless link to a cell tower as a backhaul network connection or an external gateway.

Embodiments of the present principles provide extended wireless communication services to a variety of users, automated machines and other computerized equipment in different scenarios under a multitude of conditions. For example, the embodiment of FIG. 10 depicts a use case scenario 1000 in which an airborne communication system 1010 provides a local wireless network 1020 for users 1025 using a wireless link 1030 to a cell tower 1035 as a backhaul network connection or an external gateway. In the use case scenario 1000 of FIG. 10, the users 1025 can be stationary or mobile. In an embodiment in which the users are stationary, the airborne communication system 1010 can be stationary as well and hover or loiter above the users 1025. In an embodiment in which the users are mobile, the airborne communication system 1010 can be configured to follow the users 1025, automatically tracking the movement and/or location of the users 1025. Although FIG. 10 depicts the implementation of a specific aircraft, such as a rotorcraft, other types of aircraft can be used in accordance with the present principles as described above.

In the use case scenario 1000 of FIG. 10, the local wireless network 1020 enables direct communication between users 1025. The network depicted in FIG. 10 can be implemented for example as a WiFi network, a local GSM network, or a local LTE network. Users 1025 can be authenticated locally if required by a microcontroller onboard the communication system 1010. If available, a nearby cell tower 1035 can be used as a gateway for connecting to external networks. The gateway can also be used to authenticate users 1025 with other service providers and enable direct communication amongst the users using networks from the providers.

Figure 11:
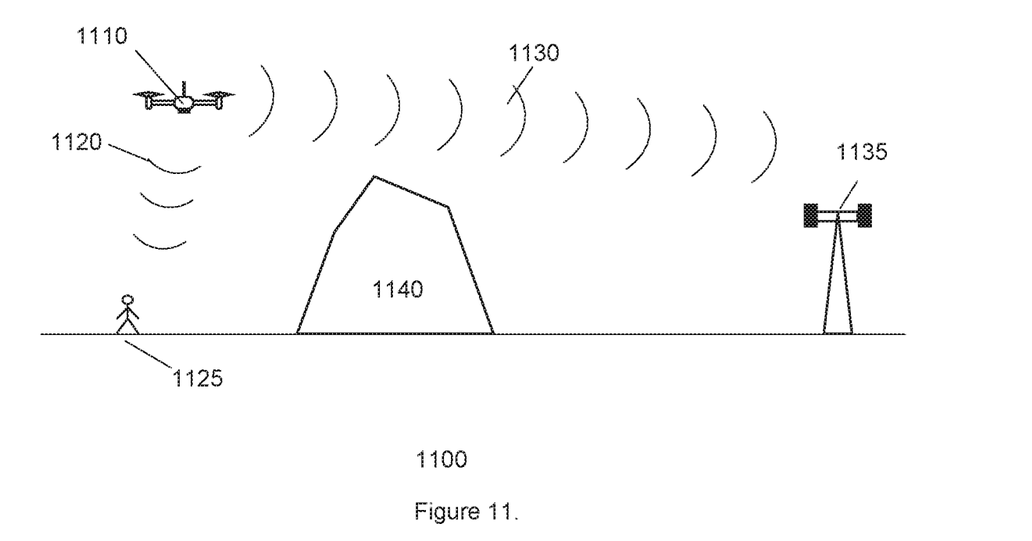
FIG. 11 depicts a use case scenario of an airborne communication system in accordance with an alternate embodiment of the present principles.

FIG. 11 depicts a use case scenario 1100 of an airborne communication system 1110 in accordance with an alternate embodiment of the present principles. In the use case scenario 1100 of FIG. 11, the airborne communication system 1110 provides a local wireless network 1120 for users 1125 using a wireless link 1130 to a cell tower 1135 as a backhaul network connection. The local wireless network 1120 can be implemented, for example, as a WiFi network, a local GSM network, or a local LTE network. In the embodiment of FIG. 11, the users 1125 are not able to establish a direct connection with the cell tower 1135, because of an obstacle 1140 (e.g. a tall hill or a building). However, the position of the airborne communication system 1110 above the obstacle 1140, enables the establishment of a LOS wireless link 1130 with the tower 1135. The airborne communication system 1110 can then use the network 1120 as an extension of the wireless services provided by the tower 1135 (or rather by a mobile service carrier using the tower as an access point for its network), which would be otherwise unavailable to the users 1125. In other embodiments, the airborne communication system 1110 is able to land on, near, above or around the top of the obstacle 1140 with the clear LOS to both the users 1125 and the tower 1135 in order to conserve energy and continue to provide wireless services to the users 1125. In various embodiments, the wireless links 1120 and 1130 can be continuous or intermittent depending on the service requirements and system limitations. For example, if the service provided is primarily M2M (machine-to-machine) communications or IOT (internet-of-things) applications, then the service provided can be used only periodically to optimize energy consumption and/or communication bandwidth utilization.

Figure 12:
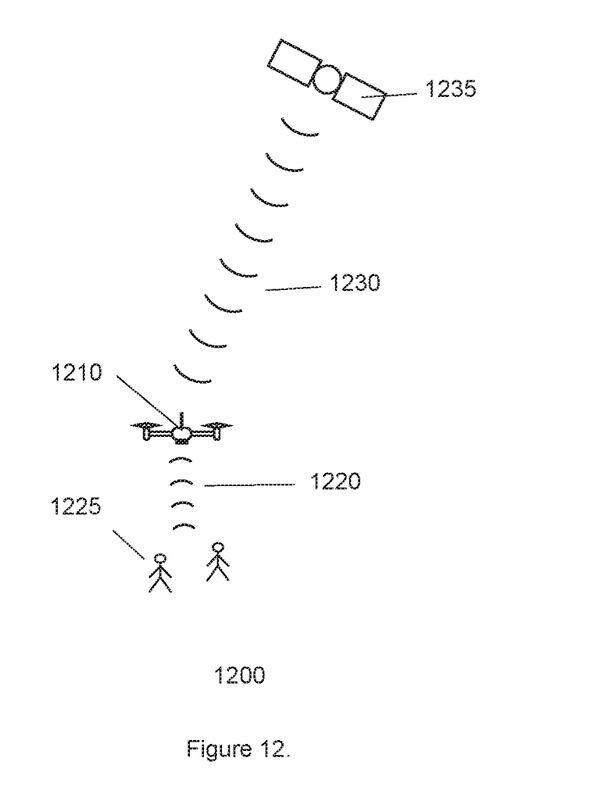
FIG. 12 depicts a use case scenario of an airborne communication system in accordance with an alternate embodiment of the present principles.

FIG. 12 depicts a use case scenario 1200 of an airborne communication system 1210 in accordance with an alternate embodiment of the present principles. In the use case scenario 1200 of FIG. 12, the airborne communication system 1210 provides a local wireless network 1220 for users 1225 using a wireless link 1230 to a communications satellite 1235 as a backhaul network connection. The payload of the airborne communication system 1210 can include at least two transponders (not shown), one of which can be configured as an LTE access point and the other as a satellite transponder. The satellite transponder can be connected to a microwave antenna, which can be, for example, a phased array antenna programmed to track the position of the satellite 1235. The configuration of the airborne communication system 1210 of FIG. 12 is particularly useful in remote areas and emergency situations in the absence of a functional terrestrial communication infrastructure.

Figure 13:
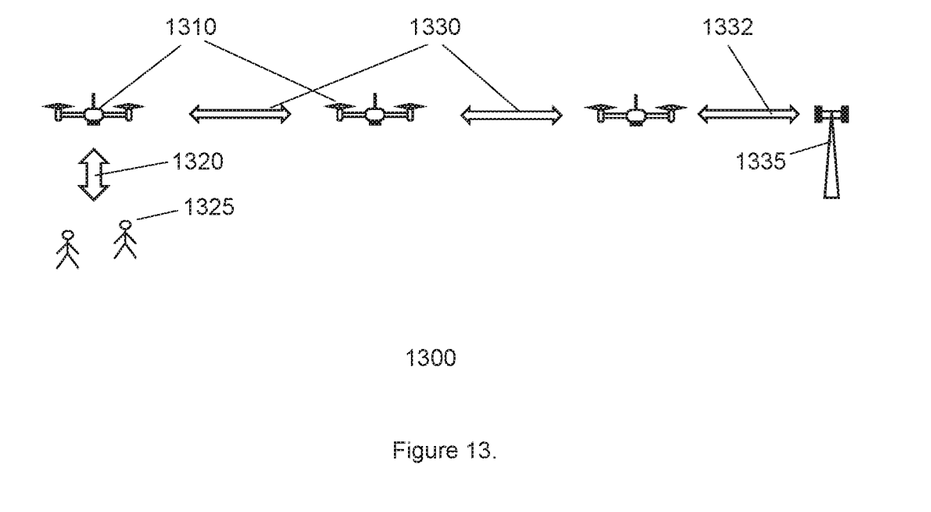
FIG. 13 depicts a use case scenario of an airborne communication system in accordance with an alternate embodiment of the present principles.

FIG. 13 depicts a use case scenario 1300 of an airborne communication system in accordance with an alternate embodiment of the present principles. In the use case scenario 1300 of FIG. 13, the airborne communication system comprises multiple airborne units 1310, at least one of which is configured to provide a local wireless network 1320 for users 1325. In such an embodiment, a backhaul connection is established using a plurality of wireless links 1330 and 1332. The link 1330 can be used as a bidirectional relay between two different units, collectively 1310, while the link 1332 can be used as a terminal link to a communication tower 1335 or another access point. The units 1310 can act as network nodes thus forming a unified airborne wireless network or a cluster of interconnected network nodes. Such a network can be implemented as a mesh network comprised of fixed point-to-point links 1330, or a less structured ad-hoc network with a highly distributed and dynamic link architecture between the nodes. Some or all of these nodes can provide individual local wireless networks 1320, similar to individual cell sites in terrestrial mobile cellular networks. The wireless networks 1320 can be, for example, WiFi networks. The links 1330 can be implemented, for example, either as WiFi links or other RF links using customized protocols optimized for fast and reliable data relays. In other embodiments, the links 1332 can be implemented as LTE communication links.

Figure 14:
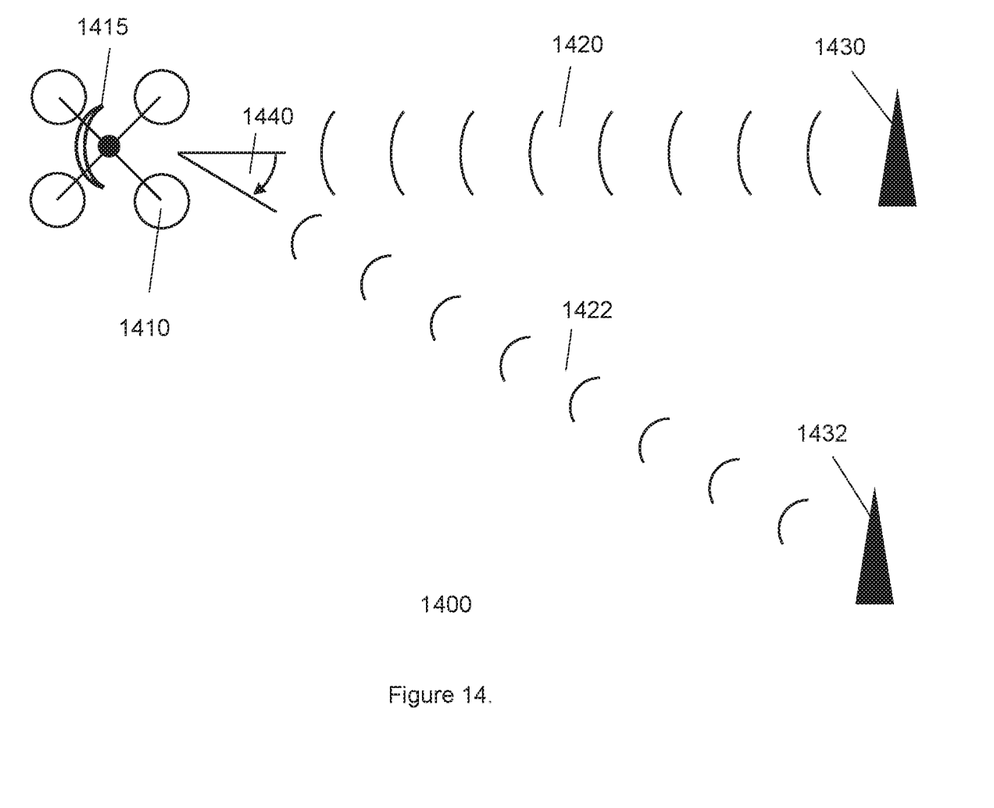
FIG. 14 depicts a use case scenario of an airborne communication system in accordance with an alternate embodiment of the present principles.

FIG. 14 depicts a use case scenario 1400 of an airborne communication system 1410 in accordance with an alternate embodiment of the present principles. In the use case scenario 1400 of FIG. 14, the airborne communication system 1410 comprises a high-gain RF directional antenna 1415 and has the capabilities to change its position and attitude (i.e. orientation). In the embodiment of FIG. 14, one or more wireless communication links can be optimized by varying the relative position and attitude of the airborne communication system 1410 with respect to the ground, for example, by changing a yaw angle 1440. Accordingly, the strength and quality of a wireless link associated with the antenna 1415 can be improved by seeking and pointing directly at available access points, such as towers 1430 and 1432. In addition, a stronger link 1420 can be selected versus a relative weaker link 1422 by pointing the antenna 1415 at the tower 1430 (assuming that the link 1420 is stronger than the link 1422, because the corresponding tower 1430 is closer than the tower 1432). The link quality can be optimized by changing either the position of the communication system 1410 as a whole or just the position of the antenna 1415. In addition, wireless links to other communication equipment, such as user mobile equipment on the ground or communication satellites in space, can be optimized in similar ways. Furthermore, multiple wireless links can be optimized simultaneously using a similar approach. For example, a backhaul link can be optimized by selecting a specific orientation of the communication system 1410 in the horizontal plane, while a local wireless link can be optimized by selecting a specific orientation in the vertical plane (either for an airborne platform or individual antennas).

Figure 15:
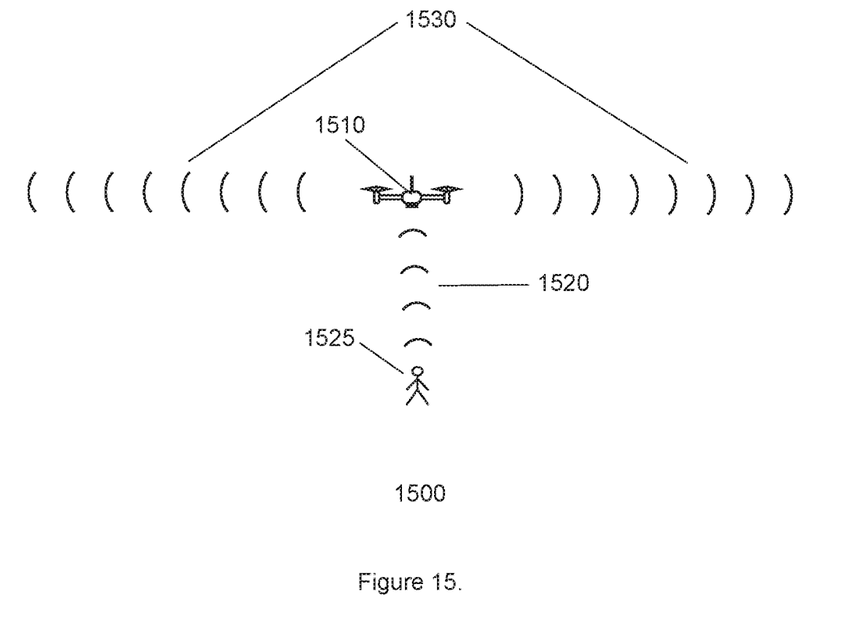
FIG. 15 depicts a use case scenario of an airborne communication system in accordance with an alternate embodiment of the present principles.

FIG. 15 depicts a use case scenario 1500 of an airborne communication system 1510 in accordance with an alternate embodiment of the present principles. In the use case scenario 1500 of FIG. 15, the airborne communication system 1510 establishes a wireless link 1520 to at least one user 1525 and a broadcast wireless link 1530. The wireless link 1520 can be used to receive data from the user 1525 in the form of, for example, a voice transmission. The data can then be retransmitted by the communication system 1510 via the broadcast link 1530. The broadcast link 1530 can be an RF wireless link, such an AM/FM radio broadcast transmission. Alternatively, the broadcast link 1530 can be an audio transmission provided by an acoustic speaker. The airborne communication system 1510 can be most relevant in emergency situations, where multiple users can be interested in receiving public broadcasts and announcements from local emergency centers, and search and rescue operations. Alternatively, the airborne communication system 1510 can be used by the user 1525 in distress situations; for example, during maritime distress the communication link 1530 can be tuned to one or more international distress frequencies. In various embodiments, the communication link 1530 can be either unidirectional or bidirectional for providing two-way communications. In embodiments in accordance with the present principles, a number of different airborne platforms described above can be used for implementing the airborne communication system 1510 and any other airborne communication systems as described above.

Figure 16:
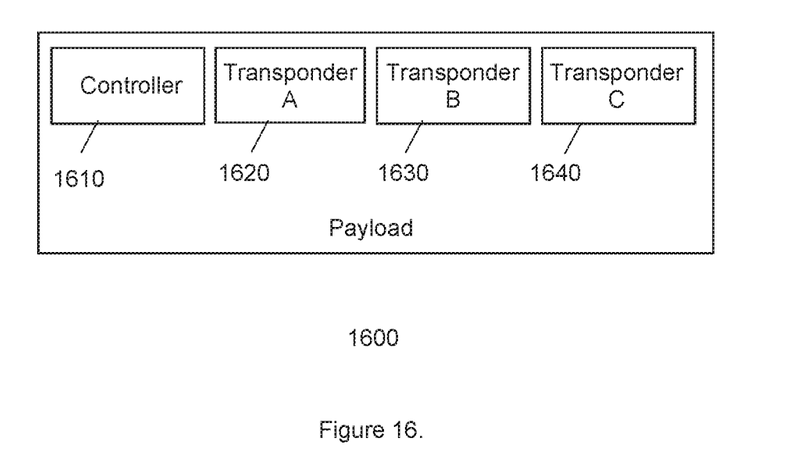
FIG. 16 depicts a high level block diagram of a communication payload that can be used in the communication system FIG. 1 in accordance with an alternate embodiment of the present principles.

FIG. 16 depicts a high level block diagram of a communication payload 1600 that can be used in the communication system 100 in place of the communication payload 120 of FIG. 1 in accordance with an alternate embodiment of the present principles. The payload 1600 of FIG. 16 illustratively comprises a controller 1610 and three communication transponders A, B and C (1620, 1630 and 1640, respectively). In some embodiments, the three transponders can be similar to each other in their purpose, function or operation.

For example, with respect to the use scenario 1300 of FIG. 13, the transponder A (1620) can provide the wireless link 1320, the transponder B (1630) can provide the wireless link 1330 and the transponder C (1640) can provide the wireless link 1332. In alternate embodiments, the three transponders can have different purposes, functions or operations. For example, in another example, the transponder A (1620) can comprise an RF transponder, the transponder B (1630) can comprise an optical transponder and the transponder C (1640) can comprise an acoustic transponder.

Figure 17:
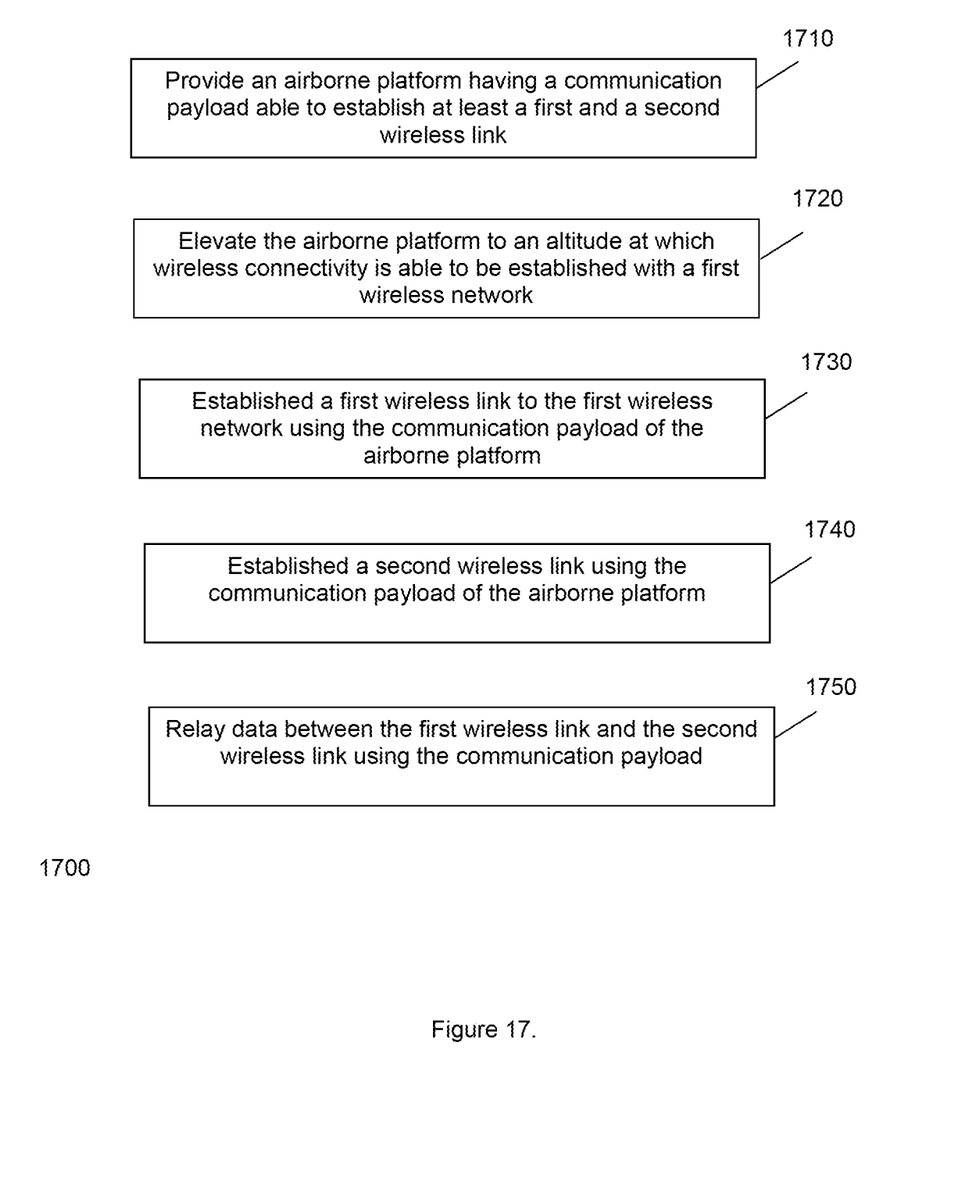
FIG. 17 depicts a flow diagram of a method for providing extended wireless communication in accordance with an embodiment of the present principles.

FIG. 17 depicts a flow diagram of a method 1700 for providing extended wireless communication in accordance with an embodiment of the present principles. The method 1700 of FIG. 17 begins at 1710 during which an airborne platform having a communication payload able to establish at least a first and a second wireless link is provided. As described above, in various embodiment in accordance with the present principles, an airborne communication system can include an airborne platform which can comprise substantially any aircraft, such as a plane, rotorcraft, vertical take-off and landing (VTOL) aircraft, rocket, lighter-than-air (LTA) aircraft or a kite and can include a flight control system to control the platforms attitude or position while being airborne or on the ground. As described above, the airborne platform of the various embodiments in accordance with the present principles comprises a communication payload able to establish at least a first and a second wireless link using, for example, at least two wireless transponders and/or wireless antennas. The method 1700 can proceed to 1720.

At 1720, the airborne platform is elevated to an altitude at which wireless connectivity is able to be established with a first wireless network. As described above, and, for example, with reference to the embodiment of the present principles depicted in FIG. 11, the airborne platform is elevated to enable the establishment of a LOS wireless link with a first wireless network, such as the network represented by the cellular tower 1135 in the embodiment of FIG. 11. The method 1700 can proceed to 1730.

At 1730, a first wireless link is established to the first wireless network using the communication payload of the airborne platform. As described above, in various embodiments of the present principles, components of the communication payload of an airborne platform, such as a first wireless transponder and a wireless antenna(s), are used to establish a wireless link to a wireless network, such as a cellular network. The method 1700 can proceed to 1740.

At 1740, a second wireless link is established using the communication payload of the airborne platform. As described above, in various embodiments of the present principles, components of the communication payload of an airborne platform, such as a second wireless transponder and a wireless antenna(s), are used to establish a second wireless link to, for example, a user or client of the first communication network. The method 1700 can proceed to 1750.

At 1750, data is relayed between the first wireless link and the second wireless link using the communication payload. As described above, in various embodiments of the present principles, established wireless links can be implemented, for example, either as WiFi links or other RF links using customized protocols optimized for fast and reliable data relays between the link endpoints. The method 1700 can then be exited.

Methods for providing extended wireless communication in accordance with the present principles can optionally further include optimizing the established wireless links by adjusting an altitude and attitude (position) of the airborne platform and/or the wireless antenna(s).

Methods for providing extended wireless communication in accordance with the present principles can also optionally further include flight control functions, such as, planning the flight path, avoiding collision with ground-based or airborne objects, tracking users on the ground, landing and emergency management, providing real-time telemetry and flight status warnings. Other communication functions can include selection of appropriate network configuration, user authentication, power management, user traffic management, network operator support and diagnostics and others at least as described above.

In accordance with the present invention, at least some of the methods provide explicit coupling between flight control functions and communication functions of the airborne communication systems described above. For example, a flight control system (FCS) can be tasked to point an antenna in the direction of the source (or a receiving target). The FCS can be tasked with positioning an airborne platform directly above users for optimum coverage. Alternatively, it can be tasked with positioning an airborne platform above an obstacle between different sources/targets. The FCS can be also tasked with optimizing the position and orientation of an airborne platform to improve signal transmission and reception on any of its wireless links. The FCS can be able to alter the aircraft altitude to increase signal strength or user coverage area (lower altitude for stronger signal, higher altitude for larger coverage). The FCS can also provide capabilities to change antenna position (e.g. by changing a gimbal mount orientation) in response to changes in a platform's position and attitude. The FCS can be also tasked with creating different flight plans for different mode of operations (including position search and stationary modes), seeking an optimum location and orientation to optimize overall network performance, and keeping a stationary position around the optimum location.

The FCS described above provides the autonomous functionality for the airborne platforms and may include a navigation module, a guidance module and a control module. The navigation module can evaluate the platform's position and its environment. The guidance module can evaluate and provide flight plans for different missions. And the control module can provide low level flight control functions and able to respond to guidance commands. This FCS can function as an autopilot following a predefined flight plan. Alternatively, it can be able to determine its own flight plan, when given specific criteria for its flight pattern optimization. Such criteria in the form of specific parameters (for example such as a net communication capacity in Mbps) can be provided by a communication payload onboard the airborne platform. This requires a direct interface between the payload and FCS for exchange of relevant data and metrics. Alternatively, the payload controller can be integrated with the FCS in one unit as described above and the data can be exchanged internally between different software routines responsible for performing flight control and communication functions, respectively.

Figure 18:
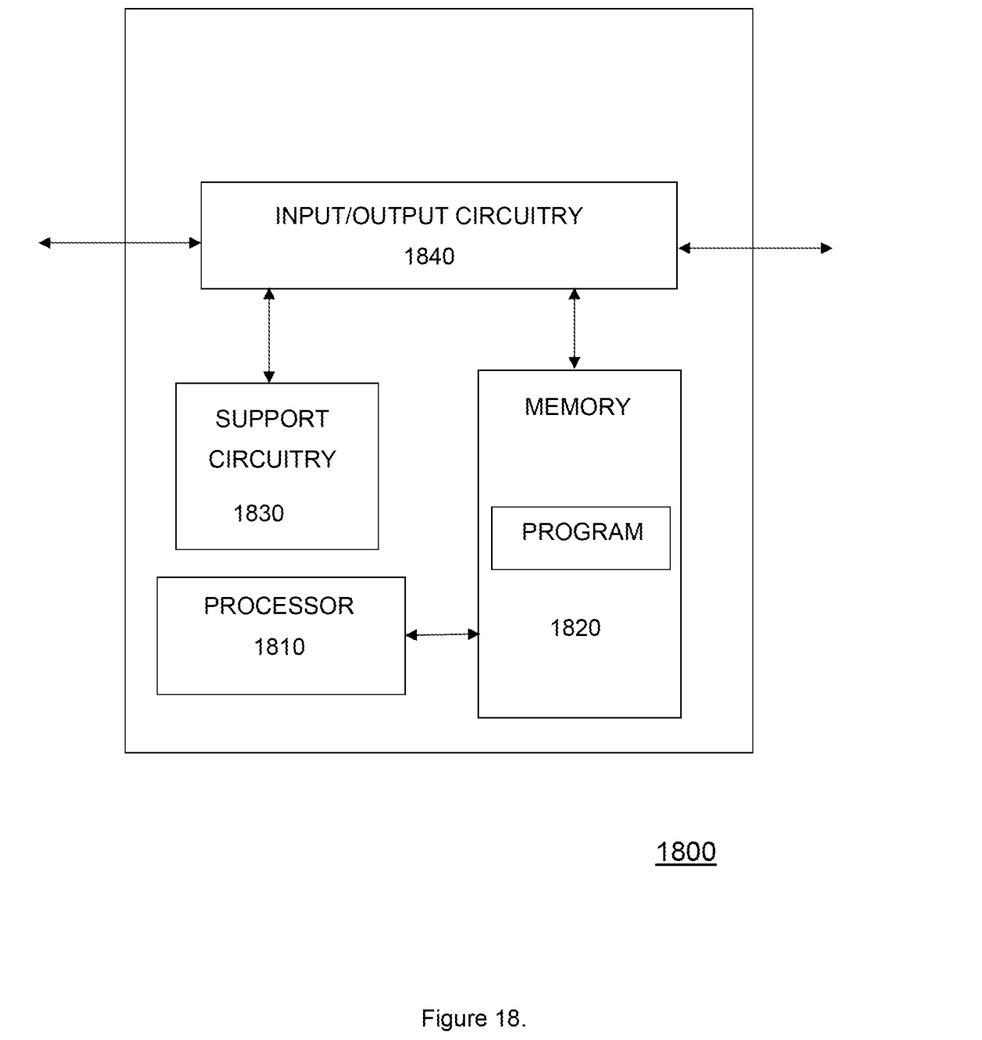
FIG. 18 depicts a high level block diagram of a controller of a communication payload in accordance with an embodiment of the present principles.

FIG. 18 depicts a high level block diagram of a controller of a communication payload, such as the controller 122 of FIG. 1, the network controller 222 of FIG. 2 and the microcontroller 310 of FIG. 3 in accordance with an embodiment of the present principles.

The controller 1800 of FIG. 18 illustratively comprises a processor 1810 as well as a memory 1820 for storing control programs and the like. The processor 1810 cooperates with support circuitry 1830 such as power supplies, clock circuits, cache memory and the like as well as circuits that assist in executing the software routines/programs stored in the memory 1820. As such, some of the process steps discussed herein as software processes may be implemented within hardware, for example, as circuitry that cooperates with the processor 1810 to perform various steps. The controller 1800 also contains input-output circuitry 1840 that forms an interface between the various functional elements communicating with the controller 1800.

Although the controller 1800 of FIG. 18 is depicted as a general purpose computer, the controller 1800 is programmed to perform various specialized control functions in accordance with the present principles and as such is a particular machine for performing specialized functions in accordance with the present principles and embodiments can be implemented in hardware, for example, as an application specified integrated circuit (ASIC). As such, the process steps described herein are intended to be broadly interpreted as being equivalently performed by software, hardware, or a combination thereof.

While the foregoing is directed to embodiments of the present invention, other and further embodiments of the invention can be devised without departing from the basic scope thereof.

The invention claimed is:

1. A method for providing extended wireless communications, comprising:
    providing an airborne platform having a communication payload able to establish at least a first and a second wireless link, and a flight control system able to alter a position and an attitude of the airborne platform;
    elevating the airborne platform using the flight control system to an altitude at which wireless connectivity is able to be established with a first wireless network;
    establishing a first wireless link to the first wireless network using the communication payload of the airborne platform;
    establishing a second wireless link using the communication payload of the airborne platform;
    relaying data between the first wireless link and the second wireless link using the communication payload;
    monitoring data associated with at least one of the first wireless link and the second wireless link using a controller associated with the communication payload, wherein the monitored data includes at least one of a signal strength or a coverage area for the at least one of the first wireless link and the second wireless link; and
    altering the position and the attitude of the airborne platform by adjusting flight control elements of the airborne platform using the flight control system until a position and an attitude is located for the airborne platform at which at least one of the signal strength or the coverage area for at least one of the first and the second wireless links with which the airborne platform is already in communication is optimized, as determined by the controller.

2. The method of claim 1, wherein establishing a second wireless link comprises establishing a wireless link to a second wireless network and providing an access point to the second wireless network.

3. The method of claim 1, wherein establishing a second wireless link comprises connecting to external communication equipment.

4. The method of claim 1, wherein at least one of the first and second wireless links are established using at least a first directional radio antenna.

5. The method of claim 4, wherein the first directional antenna is positioned on a gimbal mount and operable to change its orientation.

6. The method of claim 4, wherein the first directional antenna is integrated into an airframe of the airborne platform.

7. The method of claim 4, wherein the first and second wireless links are established using the first directional radio antenna and a second directional antenna and wherein the second directional antenna is oriented in a different direction from that of the first directional antenna.

8. The method of claim 1, wherein the communication payload comprises a microcontroller, a first wireless transponder and a second wireless transponder and wherein the first wireless transponder and the second wireless transponder are connected and controlled by the microcontroller.

9. The method of claim 1, wherein the flight control system comprises navigation, guidance and control modules.

10. The method of claim 1, wherein providing the first and second wireless links for the airborne platform comprises providing a first wireless transponder and a second wireless transponder and wherein the first wireless transponder and the second wireless transponder are connected and operated by the flight control system.

11. The method of claim 1, wherein the airborne platform is an autonomous airborne platform.

12. The method of claim 11, further comprising optimizing at least one of the first and second wireless links by using the flight control system to automatically seek an optimum platform position and an attitude.

13. The method of claim 12, wherein the seeking an optimum platform position and an attitude comprises at least one of rising above an obstacle, moving the platform horizontally, and changing the platform's orientation.

14. The method of claim 1, wherein the optimizing comprises at least one of increasing received and transmitted signal strength in at least one of the first and second wireless links, reducing interference with external wireless links, switching at least one of the first and second wireless links to a stronger wireless link, increasing area coverage for at least one of the first and second wireless links, and creating a flight plan around the optimum position.

15. The method of claim 1, wherein one of the first and second wireless links is one of radio, optical and acoustic link.

16. The method of claim 15, wherein the radio link is one of WiFi, GSM and LTE link.

17. The method of claim 15, wherein the radio link is provided by a software defined radio.

18. The method of claim 15, wherein the radio link is one of analog radio and digital radio.

19. The method of claim 15, wherein the optical link is provided by an optical transponder.

20. The method of claim 15, wherein the acoustic link is provided by one of a microphone and an acoustic speaker.

21. The method of claim 1, wherein one of the first and second wireless link is configured for broadcasting.

22. The method of claim 1, wherein the airborne platform is one of a fixed-wing plane, a rotorcraft, a vertical take-off and landing aircraft, a lighter-than-air aircraft and a kite.

23. The method of claim 1, further providing a third wireless link.

24. The method of claim 1, further providing a wired link.

25. An apparatus for providing extended wireless communications, comprising:

a first controller able to elevate an airborne platform on which a communication payload exists to an altitude at which wireless connectivity is able to be established with a first wireless network;
a communication payload comprising:
　at least two transponders to establish wireless links; and
　a second controller having a processor and a memory coupled to the processor, the memory having stored therein instructions executable by the processor to cause the apparatus to:
　　establish a first wireless link to the first wireless network;
　　establish a second wireless link;
　　relay data between the first wireless link and the second wireless link using the communication payload;
　　monitor data associated with at least one of the first wireless link and the second wireless link using the second controller of the communication payload, wherein the monitored data includes at least one of a signal strength or a coverage area for the at least one of the first wireless link and the second wireless link; and
　　alter a position and an attitude of the airborne platform by adjusting flight control elements of the airborne platform using the first controller until and maintain a position and an attitude is located for the airborne platform at which at least one of the signal strength or the coverage area for at least one of the first and the second wireless links with which the airborne platform is already in communication is optimized, as determined by the second controller.

26. The apparatus of claim 25, wherein the communication payload communicates a signal to the first controller of the airborne platform to elevate the airborne platform.

27. An airborne communication system for providing extended wireless communications, comprising:
an airborne platform including:
　at least one antenna to pick up and radiate wireless signals;
　a platform controller to control an altitude and attitude of the airborne platform; and
　a communication payload, wherein the communication payload comprises:
　　at least two transponders to establish wireless links; and
　　a controller having a processor and a memory coupled to the processor, the memory having stored therein instructions executable by the processor to cause the airborne communication system to:
　　　elevate the airborne platform to an altitude at which wireless connectivity is able to be established with a first wireless network;
　　　establish a first wireless link to the first wireless network;
　　　establish a second wireless link;
　　　relay data between the first wireless link and the second wireless link;
　　　monitor data associated with at least one of the first wireless link and the second wireless link using the controller of the communication payload, wherein the monitored data includes at least one of a signal strength or a coverage area for the at least one of the first wireless link and the second wireless link; and alter the attitude and the altitude of the airborne platform by adjusting flight control elements of the airborne platform using the controller until an attitude and an altitude is located for the airborne platform at which at least one of the signal strength or the coverage area for at least one of the first and the second wireless links with which the airborne platform is already in communication is optimized, as determined by the controller.

\* \* \* \* \*